United States Patent [19]

Houlihan

[11] 3,709,677
[45] Jan. 9, 1973

[54] N-SUBSTITUTED SULFAMOYL COMPOUNDS USEFUL AS HERBICIDES

[75] Inventor: William J. Houlihan, Mountain Lakes, N.J.

[73] Assignee: Sandoz-Wander, Inc., Hanover, N.J.

[22] Filed: June 25, 1969

[21] Appl. No.: 836,629

[52] U.S. Cl. ............................71/94, 71/84, 71/92, 71/95, 71/103, 260/268, 260/288, 260/294.8, 260/326.82, 260/556
[51] Int. Cl. ...................................................A01n 9/22
[58] Field of Search..................................71/92, 103

[56] References Cited

UNITED STATES PATENTS

| | | | |
|---|---|---|---|
| 3,485,817 | 12/1969 | Strycker | 71/92 |
| 3,498,780 | 3/1970 | Sober et al. | 71/103 |
| 3,535,324 | 10/1970 | Hamer | 71/94 X |
| 3,535,328 | 10/1970 | Zielinski | 71/94 X |

*Primary Examiner*—James O. Thomas, Jr.
*Attorney*—Gerald D. Sharkin, Frederick H. Weinfeldt, Robert S. Honor, Walter F. Jewell and Richard E. Vila

[57] ABSTRACT

Substituted N-sulfamoyl pyridine compounds are useful in the destruction and prevention of weeds and unwanted plants.

7 Claims, No Drawings

N-SUBSTITUTED SULFAMOYL COMPOUNDS USEFUL AS HERBICIDES

The invention relates to N-sulfamoyl compounds which possess post and pre-emergent herbicidal activity. The invention relates in particular to N-sulfamoyl compounds having herbicidal activity in which the nitrogen atom is a member of a heterocyclic ring or is attached directly to an organic ring.

The herbicidally active sulfamoyl compounds contemplated by the present invention are selected from compounds having the structure:

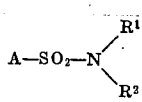

I where $R^1$ and $R^2$ are hydrogen or a lower alkyl, i.e., containing one to four carbon atoms such as methyl, and A is a nitrogen containing moiety selected from:

(i) 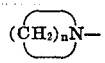

where $n$ is 4 to 12, preferably 4 to 8;

ii. a piperidino radical of the formula

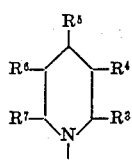

where $R^3$, $R^4$, $R^5$, $R^6$ and $R^7$ represent hydrogen, lower alkyl containing one to four carbon atoms, and phenyl, provided at least three of the $R^3$, $R^4$, $R^5$, $R^6$ and $R^7$ are hydrogen and provided also that at least one of $R^3$, $R^4$, $R^5$, $R^6$ and $R^7$ is other than hydrogen;

iii. a 4-phenyl-1,2,5,6-tetrahydropyridino radical having the structure

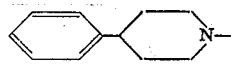

iv. a piperazino radical of the formula

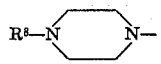

and its acid addition salts where $R^8$ represents a lower alkyl containing one to four carbon atoms, phenyl, chlorophenyl, methoxyphenyl, benzyl or chlorobenzyl;

v. a 1,2,3,4-tetrahydro isoquinolino radical having the structure

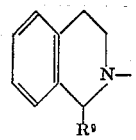

where $R^9$ is hydrogen or benzyl; and vi. a group having the structure

where $R^{10}$ represents hydrogen or lower alkyl having one to four carbon atoms and $R^{11}$ represents cyclohexyl, 1,2,3,4-tetrahydro-1-naphthyl, 1-indanyl or 2-indanyl.

The compounds of formula I in which the "A" is a piperazino radical form acid addition salts having the same order of activity as the base. Representative of such salts are the mineral acid salts, such as the hydrochloride, hydrobromide, sulfate, phosphate and the like and the organic acid salts, such as the succinate, benzoate, acetate, p-toluenesulfonate, benzene sulfonate and the like. The salts are readily prepared by reacting the base with the appropriate acid.

An additional aspect of this invention concerns compounds of formula I which are new. These have the structure

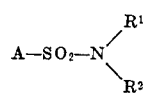

where A is:

(a) 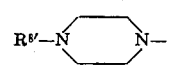

and its acid addition salts described above, (b) 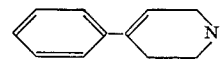

(c) 

or (d) 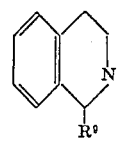

where $R^{8'}$ represents lower alkyl having one to four carbon atoms, phenyl, chlorophenyl or methoxyphenyl, and $R^9$, $R^{10}$ and $R^{11}$ represent the substituents indicated above.

The reaction involved in preparing a compound Ia in which $R^1$ and $R^2$ are hydrogen, is illustrated in the following flow diagram:

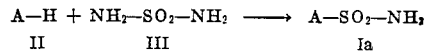

where A has the significance previously indicated.

Compound Ia is prepared by treating the amine, A-H, with sulfamide. While solvent and reaction conditions are not critical the reaction is generally carried out in an inert solvent (one which reacts with none of the reactants under the condition of the reaction) such as water, ethanol, or a tertiary amine at temperatures between about 50° and 250° C. The preferred temperature range is about 55° C. to about 125° C., and ordinarily the reaction is carried out at the reflux temperature of the system. Although stirring is preferred, it is not required. The reaction, generally, will proceed to completion in from about 1 to 5 hours.

To prepare a compound $Ib$ in which either $R^1$ or $R^2$ is other than hydrogen, the previously described amine A-H is treated with a mono or di-lower alkyl sulfamoyl chloride, compound IV. The reaction involved is shown in the following scheme:

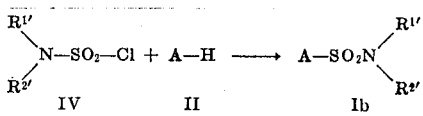

where $R^{1'}$ represents lower alkyl having one to four carbon atoms and $R^{2'}$ is hydrogen or lower alkyl having one to four carbon atoms. The reaction is carried out over a period of 1 to 5 hours preferably at a temperature between −10° and 20° C. An inert solvent, i.e., one which does not react with either of the reactants, such as pentane, hexane, heptane, benzene, diethyl ether, dioxane or one of the tertiary amines previously mentioned, is normally employed in the reaction.

In many instances, the mono or di-lower alkyl sulfamoyl compound IV is available commercially. They can also be prepared by treating an amine IIa having the structure:

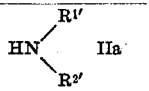

where $R^{1'}$ represents lower alkyl having one to four carbon atoms and $R^{2'}$ is either hydrogen or a lower alkyl having one to four carbon atoms, with sulfuryl chloride at a low temperature, e.g., within the range of about −50° to 0° C. The reaction involved is:

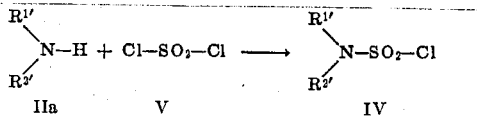

This reaction is normally carried out in an inert solvent, i.e., one which does not react with the reactants under the conditions contemplated such as a tertiary amine solvent, e.g., triethylamine or pyridine.

The produce $Ia$ or $Ib$ in the above processes can be isolated using known techniques, e.g., evaporating off the solvent and recrystallizing the crude product thus obtained from methanol-water to obtain the purified product.

Some of the preferred nitrogen-containing groups corresponding to "A" are as follows: pyrrolidino, hexamethylenimino, heptamethylenimino, octamethylenimino, dodecamethylenimino, piperidino, 4-methyl-piperidino, 2,5-dimethylpiperidino, 3,4-dimethylpiperidino, 3,5-dimethylpiperidino, 3-ethyl-piperidino, 2-methyl-5-ethylpiperidino, 4-n-propyl-piperidino, N-phenylpiperazino, N-o-chlorophenyl-piperazino, N-o-methoxyphenylpiperazino, N-p-chlorobenzylpiperazino, 1,2,3,4tetrahydroisoquinolino, N-methyl-N-cyclohexylamino, 1-aminoindanyl, 2-aminoindanyl, 1-amino-1,2,3,4-tetrahydronaphthyl and 4-phenyl-1,2,5,6-tetrahydropyridino.

The present invention is directed particularly to the novel use of the compounds of formula (I), as herbicides. Said compounds may be applied to this use after admixture with a diluent or carrier material or conditioning agent of the kind used or referred to in the art as a pest control adjuvant or modifier. The active agent may then be applied to soil, weeds or unwanted plants by use of conventional applicator equipment. Thus, formulations comprising wettable powders, emulsifiable concentrates or granules may be prepared, admixed with the appropriate diluents or carriers, and applied to provide the effect desired. The wettable powder may contain about 20–80 percent of active agent, wetting and dispersing agents, and diluent such as finely divided solids, e.g., talcs, natural clays, pyrophyllite, diatomaceous earth, and flours such as walnut shell, wheat, redwood, soya bean, and cottonseed flours. The emulsifiable concentrate may contain about 25–75 percent of active agent, solvent (water immiscible), and emulsifying agent. The granules may contain about 5–20 percent of the compounds of formula I, carrier, and possibly solvent. Other inert solid carriers which can be used to prepare the herbicidal formulations include magnesium and calcium carbonates, calcium phosphate, sulfur, lime, etc. either in powder or granular form, as may be appropriate. The percentage by weight of the essential active ingredients will vary according to the activity of the compound used and the manner in which the composition is to be applied.

The herbicidal compositions may be applied as a spray or granule to the locus or area to be protected from undesirable plant growth, commonly called weeds, i.e., plants growing there they are not wanted. Such application can be made directly upon the locus or area and the weeds thereon during the period of weed infestation in order to destroy the weeds, or alternatively, the application can be made in advance of an anticipated weed infestation to prevent such infestation. For example, the compositions can be applied as foliar sprays but can also be applied as sprays directly to the surface of the soil. Alternatively, the dry granular compositions can be applied directly to the plants or the soil.

Depending on the purpose for which the preparation is to be used, it is possible to add other materials having an influence on plant growth, for example, in order to broaden the spectrum of herbicidal activity.

The compounds of formula I may be applied at a dosage of about 2 to 30 pounds per acre, depending on the herbicidal effect desired and the particular compound used. Generally, when selective herbicidal use is contemplated, the compounds may be used in quantities of about 2–10 pounds per acre. Where non-selective use is desired about 10–20 pounds per acre may be used to provide the desired effect.

The following examples are provided for the purpose of illustration and not by way of limitation. They are not intended so as to limit the scope of the invention as defined in the appended claims.

EXAMPLE 1

The test tube having a 174 inch hole at the bottom is plugged at the hole with some glass wool. The test tube is filled to about 1½ inches from the top with quartz sand which is made inert by washing with acetone-distilled (1:1) water alone and drying. The seed of the plant to be tested is planted in the sand. The tube is fitted with a rubber collar and suspended in an Erlenmeyer flask containing conventional KOPS nutrient solution and the active agent of this invention at a concentration of 50 parts per million (no active agents in the check.) The apparatus is placed under fluorescent lights for about three weeks, and once daily the bottom of the tube is dipped into the solution.

The following results were obtained using cyclic amines having the structure:

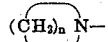

where $n = 4$ to $12$.

a. N-sulfamoylpyrrolidine

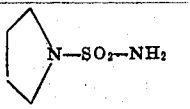

| Test Species | Plant/Seeds | % of check Top Height | Root Length | Comments |
|---|---|---|---|---|
| Field Corn No. 8 | 3/4 | 80 | 73 | Extreme wilting, much necrosis; roots reduced in number |
| Annual Ryegrass | 4/4 | 51 | 49 | Necrosis |
| Barnyard Grass | 4/4 | 73 | 65 | Extreme Necrosis |
| Wild Oat | 3/4 | 42 | 76 | Necrosis |
| Johnson grass | 1/4 | 82 | 88 | Minor wilting; roots reduced in number |
| Dawn Rice | 1/4 | 100 | 69 | Necrosis, very slightly chlorotic; roots reduced in number |
| Soybean Adelphia | 2/4 | 68 | 141 | Wilting, minor necrosis; roots reduced in number |
| Coffeeweed | 4/4 | 68 | 84 | Much necrosis, then death; roots very slightly discolored |
| Field Bindweed | 2/4 | 55 | 103 | Normal |
| Redroot Pigweed | 4/8 | 8 | 33 | No effects, then death; roots somewhat stunted |
| Cocklebur | 1/1 | 90 | 54 | Roots slightly reduced in number and very slightly discolored |
| Cotton (Coker 201) | 4/4 | 92 | 57 | Roots slightly reduced in number, very slightly discolored | b. N-dimethylsulfamoylhexamethylenimine

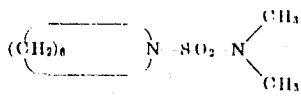

| Test Species | Plant/Seeds | % of check Top Height | Root Length | Comments |
|---|---|---|---|---|
| Annual Ryegrass | 4/4 | 35 | 54 | Much necrosis |
| Soybean (Adelphia) | 4/4 | 59 | 74 | Necrosis and epinasty, roots slightly stunted | c. N-sulfamoylheptamethyleneimine

| Test Species | Plant/Seeds | % of check Top Height | Root Length | Comments |
|---|---|---|---|---|
| Annual Ryegrass | 3/4 | 33 | 68 | Necrosis |
| Barnyard Grass | 3/4 | 91 | 70 | Necrosis |
| Wild Oat | 1/4 | 36 | 95 | Necrosis |
| Soybean Adelphia | 2/4 | 92 | 59 | Much necrosis, epinasty, slight sparseness of roots |
| Coffee weed | 3/4 | 46 | 68 | Extreme necrosis |
| Field Bindweed | 4/4 | 58 | 93 | Necrosis |
| Redroot Pigweed | 6/8 | 75 | 50 | Necrosis | d. N-sulfamoyloctamethylenimine

| Test Species | Plant/Seeds | % of check Top Height | Root Length | Comments |
|---|---|---|---|---|
| Annual Ryegrass | 3/4 | 23 | 43 | Extreme necrosis |
| Barnyard Grass | 3/4 | 82 | 78 | Much necrosis |
| Wild Oat | 4/4 | 40 | 95 | Necrosis |
| Soybean Adelphia | 3/4 | 50 | 44 | Much necrosis, epinasty, slight sparseness of roots |
| Coffee-weed | 3/4 | 60 | 58 | Extreme necrosis |
| Velvet Leaf | 4/4 | 67 | 61 | Much necrosis, roots stunted |
| Cotton Coker 201 | 1/4 | 96 | 54 | Minor necrosis, slight epinasty, much stunting of roots | e. N-sulfamoyldodecamethylenimine

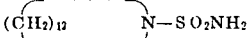

| Test Species | Plant/Seeds | % of check Top Height | Root Length | Comments |
|---|---|---|---|---|
| Field No. 8 | 4/4 | 91 | 53 | Extreme necrosis, minor wilting, roots stunted, sparse and very slightly discolored |

| Test Species | Plant/Seeds | % of Check Top Height | Root Length | Comments |
|---|---|---|---|---|
| Annual Ryegrass | 4/4 | 42 | 59 | Very slight necrosis; roots stunted and sparse |
| Barnyard Grass | 2/4 | 64 | 44 | Chlorosis and very slight necrosis, then death; roots sparse and very stunted |
| Wild Oat | 1/4 | 32 | 57 | Much stunting of roots |
| Johnsongrass | 1/4 | 26 | 44 | Extreme necrosis; very much stunting of roots |

EXAMPLE 2

Using the procedure outlined in the preceding example, the following results were obtained with compounds having the structure

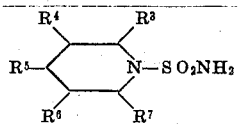

a. N-sulfamoylpiperidine

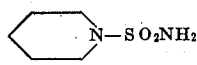

| Test Species | Plant/Seeds | % of check Top Height | Root Length | Comments |
|---|---|---|---|---|
| Field Corn | 4/4 | 48 | 53 | Extreme wilting, much necrosis, roots much reduced in number |
| No. 8 Annual Ryegrass | 4/4 | 40 | 70 | Necrosis |
| Barnyard Grass | 4/4 | 73 | 61 | Extreme necrosis and minor chlorosis, then death |
| Dawn Rice | 2/4 | 60 | 77 | Necrosis, roots somewhat stunted |
| Coffeeweed | 4/4 | 78 | 53 | Necrosis and chlorosis |
| Redroot Pigweed | 3/8 | 33 | 50 | Necrosis |
| Cotton Coker 201 | 4/4 | 96 | 86 | Roots very slightly reduced in number |

This compound shows some selectivity for cotton.

b. 4-Methyl-N-sulfamoylpiperidine

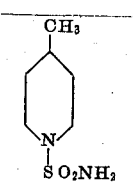

| Test Species | Plant/Seeds | % of Check Top Height | Root Length | Comments |
|---|---|---|---|---|
| Barnyard Grass | 4/4 | 77 | 61 | Extreme necrosis, then death; roots very slightly stunted |
| Redroot Pigweed | 5/8 | 8 | 33 | Chlorosis and extreme epinasty, then death; roots stunted | c. 2,5-dimethyl-N-sulfamoylpiperidine

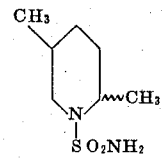

| Test Species | Plant/Seeds | % of Check Top Height | Root Length | Comments |
|---|---|---|---|---|
| Annual Ryegrass | 4/4 | 25 | 22 | Necrosis and death, sparseness and slight discoloring of the roots |
| Coffeeweed | 3/4 | 32 | 42 | Extreme necrosis and death; roots sparse |
| Redroot Pigweed | 4/8 | 17 | 17 | Auxis effect and death |
| Velvet Leaf | 4/4 | 27 | 44 | Necrosis and death | d. 3,4-Dimethyl-N-sulfamoylpiperidine

| Test Species | Plant/Seeds | % of Check Top Height | Root Length | Comments |
|---|---|---|---|---|
| Annual Ryegrass | 2/4 | 28 | 32 | Considerable chlorosis and necrosis; minor sparseness of roots |
| Barnyard Grass | 3/4 | 82 | 35 | Necrosis and death; slight discoloration of roots |
| Wild Oat | 3/4 | 40 | 67 | Chlorosis and considerable necrosis; minor sparseness of roots |
| Johnsongrass | 2/6 | 41 | 19 | Necrosis and death; minor discoloration of roots |
| Soybean Adelphia | 3/4 | 73 | 83 | Considerable necrosis; minor discoloration of roots |
| Coffeeweed | 4/4 | 57 | 63 | Necrosis and death; minor sparseness of roots |
| Field Bindweed | 3/4 | 30 | 20 | Necrosis and death |
| Redroot Pigweed | 1/8 | 17 | 50 | Extreme auxin effect and death |
| Velvet | 3/4 | 40 | 22 | Extreme necrosis and death |

Leaf e. 3,5-Dimethyl-N-sulfamoylpiperidine

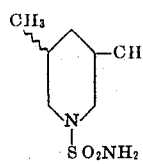

| Test Species | Plant/ Seeds | % of Check Top Height | Root Length | Comments |
|---|---|---|---|---|
| Field No. 8 | 4/4 | 123 | 47 | Much necrosis |
| Annual Ryegrass | 4/4 | 30 | 65 | Much necrosis |
| Barnyard Grass | 4/4 | 73 | 43 | Epinasty, then death; roots somewhat stunted |
| Wild Oat | 4/4 | 28 | 57 | Much necrosis; roots somewhat stunted |
| Soybean Adelphia | 4/4 | 70 | 65 | Extreme necrosis and much epinasty |
| Coffee-weed | 4/4 | 72 | 58 | Necrosis and much epinasty then death | f. 3-Ethyl-N-sulfamoylpiperidine

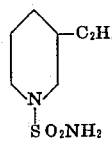

| Test Species | Plant/ Seeds | % of Check Top Height | Root Length | Comments |
|---|---|---|---|---|
| Annual Ryegrass | 4/4 | 42 | 16 | Considerable Chlorosis |
| Barnyard Grass | 4/4 | 63 | 20 | Extreme necrosis and death |
| Wild Oat | 1/4 | 40 | 47 | Extreme chlorosis |
| Coffee-weed | 4/4 | 56 | 42 | Auxin effect, necrosis and death; minor sparseness of roots |
| Field Bindweed | 3/4 | 45 | 67 | Necrosis and death; sparseness of roots |
| Redroot Pigweed | 2/8 | 8 | 33 | Auxin effect and death |
| Velvet Leaf | 3/4 | 40 | 33 | Extreme necrosis and death; spareseness of roots | g. 2Methyl-5-ethyl-N-sulfamoylpiperidine

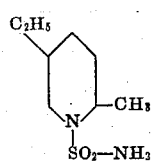

| Test Species | Plant Seeds | % of Check Top Height | Root Length | Comments |
|---|---|---|---|---|
| Field Corn | 4/4 | 82 | 47 | Much necrosis, much wilting; roots very discolored |
| No. 8 Annual Ryegrass | 4/4 | 37 | 35 | Necrosis; roots very slightly stunted |
| Soybean Adelphia | 3/4 | 80 | 59 | Epinasty and much necrosis, roots somewhat sparse and very slightly discolored |
| Coffee-weed | 4/4 | 76 | 74 | Much necrosis, then death |
| Velvet Leaf | 1/4 | 33 | 33 | Epinasty, then death; roots extremely stunted |
| Cotton Coker 201 | 2/4 | 71 | 57 | Minor necrosis; roots very discolored | h. 4-(n-propyl)-N-sulfamoylpiperidine

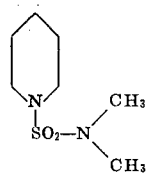

| Test Species | Plant/ Seeds | % of Check Top Height | Root Length | Comments |
|---|---|---|---|---|
| Field Corn No. 8 | 3/4 | 80 | 27 | Extreme necrosis; roots very stunted, somewhat sparse and very discolored |
| Annual Ryegrass | 4/4 | 32 | 43 | Minor necrosis |
| Barnyard Grass | 4/4 | 100 | 17 | Very slight necrosis, then death; roots discolored and very stunted |
| Wild oat | 2/4 | 24 | 20 | Very slight necrosis; roots very stunted |
| Johnson-grass | 1/6 | 4 | 3 | Extreme epinasty, then death; roots extremely stunted |
| Wheat Red Coat | 4/4 | 87 | 75 | Very slight epinasty |
| Redroot Pigweed | 6/8 | 17 | 50 | Extreme epinasty, then death; roots somewhat stunted |
| Cotton Coker 201 | 1/4 | 71 | 43 | Minor necrosis; roots very discolored |

This compound showed some specificity towards wheat and cotton.

i. N-dimethylsulfamoylpiperidine

| Test Species | Plant/ Seeds | % of Check Top Height | Root Length | Comments |
|---|---|---|---|---|
| Annual Ryegrass* | 3/4 | 53 | 65 | Necrosis, slight stunting of roots |
| Barnyard Grass* | 2/4 | 68 | 61 | Early death, much stunting of roots |

| Cocklebur* | 1/1 | 86 | 85 | Slight chlorosis; slight root discoloration |
| Cotton Coker 201* | 2/4 | 96 | 97 | Root discoloration |

*)The results shown were obtained at a dosage level of 10 parts per million.

EXAMPLE 3

Using the procedure of Example 1, the following results were obtained with piperazines having the structure

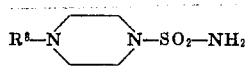

where $R^8$ is as indicated previously.

a. N-sulfamoyl-N'-phenylpiperazine

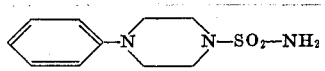

| Test Species | Plant/ Seeds | % of check Top Height | Root Length | Comments |
|---|---|---|---|---|
| Barnyard Grass | 2/4 | 16.8 | 50.0 | Leaves extremely necrotic, roots sparse; death |
| Annual Ryegrass | 4/4 | 28.6 | 88.9 | Leaves extremely necrotic and epinastic; roots slightly reduced |
| Large Crabgrass | 1/8 | 28.5 | 30.0 | Necrosis and death; roots discolored and sparse |
| Coffee Weed | 3/4 | 23.6 | 87.5 | Stem and leaves epinastic; roots unbranched, discolored |
| Field Bindweed | 3/4 | 78.1 | 200.0 | Much chlorosis and epinasty, roots unbranched |
| Cotton Coker 201 | 4/4 | 93.8 | 83.3 | Much necrosis; roots discolored |

The above results were obtained at a dosage level of 100 parts per million.

b. N-sulfamoyl-N'-(o-chlorophenyl)piperazine

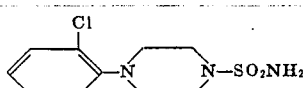

| Test Species | Plant/ Seeds | % of check Top Height | Root Length | Comments |
|---|---|---|---|---|
| Field Corn No. 8 | 4/4 | 77 | 53 | Very necrotic, rolled leaves extremely wilted, roots sparse and extremely discolored |
| Annual Ryegrass | 4/4 | 26 | 43 | Minor necrosis; roots sparse, greatly stunted and very slightly discolored |
| Barnyard Grass | 3/4 | 68 | 52 | Necrosis, then death; roots very stunted |
| Wild Oat | 4/4 | 26 | 48 | Necrosis, roots sparse and extremely stunted |
| Johnsongrass | 2/4 | 0.44 | 31 | Extreme necrosis, then early death; roots sparse and extremely stunted |
| Wheat Red Coat | 4/4 | 77 | 75 | Very slight necrosis, very slight wilting; minor stunting of roots |
| Soybean Adelphia | 4/4 | 35 | 47 | Minor necrotic spotting; roots very stunted; branch roots sparse, minor discoloration |
| Coffeeweed | 4/4 | 40 | 79 | Germination interrupted by death; roots sparse and stunted |
| Field Bindweed | 4/4 | 40 | 40 | Stunting of upper plant parts; root system extremely stunted and lacking all branch roots |
| Cotton Coker 201 | 4/4 | 83 | 79 | Somewhat epinastic growth; roots discolored, stunted, branch roots sparse. |

The results of these tests indicate that this compound has some selectivity favoring wheat and cotton.

c. N-sulfamoyl-N'-(o-methoxyphenyl)piperazine

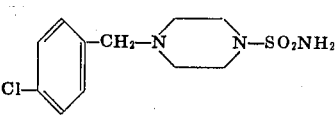

| Test Species | Plant/ Seeds | % of check Top Height | Root Length | Comments |
|---|---|---|---|---|
| Barnyard Grass | 4/4 | 75 | 52 | Much necrosis, minor discoloration of roots |
| Wild Oat | 3/4 | 40 | 76 | Necrosis |
| Coffeeweed | 3/4 | 40 | 32 | Slight necrosis, then death, roots discolored with minor sparseness |
| Cotton Coker 201 | 1/4 | 69 | 29 | Sligh necrosis, roots stunted | d. N-sulfamoyl-N'-(p-chlorobenzyl)piperazine

| Test Species | Plant/ Seeds | % of check Top Height | Root Length | Comments |
|---|---|---|---|---|
| Annual Ryegrass | 4/4 | 28 | 30 | Extreme necrosis in leaves and strong auxin effect, extreme in roots |

| Test Species | Plant/ Seeds | % of check Top Height | Root Length | Comments |
|---|---|---|---|---|
| Barnyard Grass | 3/4 | 77 | 43 | Extreme necrosis and death; auxin effect considerable in roots |
| Coffee-weed | 4/4 | 64 | 32 | Extreme auxin effect necrosis death; auxin effect high in roots |

EXAMPLE 4

Employing the procedure outlined in Example 1, the following results were obtained with N-sulfamoyl-1,2,3,4 tetrahydroisoquinoline.

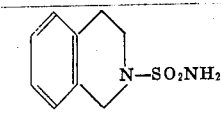

| Test Species | Plant/ Seeds | % of check Top Height | Root Length | Comments |
|---|---|---|---|---|
| Annual Ryegrass | 4/4 | 23 | 28 | Extreme necrosis and extreme epinasty; roots stunted |
| Johnson-grass | 2/6 | 56 | 75 | Much necrosis |
| Wheat Red Coat | 4/4 | 57 | 50 | Extreme necrosis and extreme epinasty; roots with minor stunting |
| Soybean Adelphia | 1/4 | 31 | 35 | Extreme epinasty and much necrosis, then death; roots greatly stunted |
| Coffee-weed | 4/4 | 84 | 39 | Much epinasty, then death; roots sparse, stunted, and discolored |
| Field Bindweed | 2/4 | 47 | 73 | Extreme necrosis and extreme epinasty |
| Redroot Pigweed | 7/8 | 50 | 42 | Minor necrosis and minor epinasty, roots very stunted |
| Velvet Leaf | 4/4 | 53 | 67 | Extreme necrosis, then death; roots with minor stunting |
| Cotton Coker 201 | 3/4 | 75 | 64 | Very slight spinasty, roots somewhat sparse. |

This compound demonstrated some selectivity in favor of cotton.

EXAMPLE 5

Using the procedure of Example 1, the following results were obtained with amines having the structure:

$$R^{12}-\overset{R^{10}}{\underset{|}{N}}-SO_2-NH_2$$

where $R^{11}$ and $R^{12}$ are as shown.

a. N-methyl-N-sulfamoylcyclohexylamine

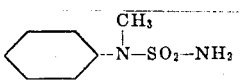

| Test Species | Plant/ Seeds | % of check Top Height | Root Length | Comments |
|---|---|---|---|---|
| Field Corn No. 8 | 4/4 | 40 | 53 | Extreme necrosis; roots discolored and greatly reduced in number |
| Annual Ryegrass | 4/4 | 28 | 70 | Much necrosis; roots very slightly discolored |
| Barnyard Grass | 3/4 | 41 | 100 | Extreme necrosis, much chlorosis; death of two out of three |
| Wild oat | 1/4 | 16 | 33 | Extreme necrosis, followed by death; roots extremely stunted |
| Dawn Rice | 1.4 | 3 | 31 | Early death, roots extremely stunted and extremely reduced in number |
| Soybean Adelphia | 3/4 | 57 | 94 | Extreme necrosis; roots very slightly reduced in number |
| Coffee-weed | 3/4 | | 58 | Necrosis, then death; branch roots reduced in number |
| Field Bindweed | 4/4 | 14 | 60 | Minor necrosis; roots epinastic, lacking in all branch roots |
| Redroot Pigweed | 7/8 | 17 | 33 | Extreme stunting, then death; minor stunting of roots |
| Cocklebur | 1/1 | 48 | 42 | Necrosis, minor epinasty; number of branch roots much reduced |
| Cotton Coker 201 | 4/4 | 92 | 64 | Roots stunted and discolored | b. 1-sulfamoylaminoindane

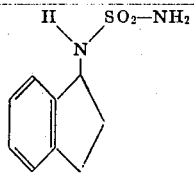

| Test Species | Plant/ Seeds | % of check Top Height | Root Length | Comments |
|---|---|---|---|---|
| Field Corn No. 8 | 4/4 | 91 | 37 | Considerable necrosis of leaves, roots extremely discolored |
| Coffee-weed | 4/4 | 64 | 32 | Considerable necrosis and death; auxin effect in both leaves and roots |
| Field Bindweed | 4/4 | 65 | 47 | Considerable necrosis in leaves; extreme auxin effect in both leaves and roots. | c. 1,2,3,4-tetrahydro-1-sulfamoylaminonaphthalene

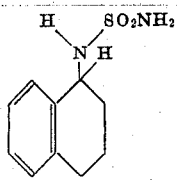

| Test Species | Plant Seeds | % of check Top Height | Root Length | Comments |
|---|---|---|---|---|
| Field Corn No. 8 | 4/4 | 117 | 105 | Minor necrosis. |
| Barnyard Grass | 3/4 | 40 | 20 | Much necrosis, then early death; much stunting of roots. |
| Wild Oat | 3/4 | 28 | 33 | Much necrosis; roots stunted |
| Wheat weed | 4/4 | 80 | 106 | Minor necrosis; minor sparseness of roots |
| Coffee-weed | 3/4 | 55 | 74 | Extreme necrosis, then death |
| Field Bindweed | 1/4 | 20 | 24 | Much epinasty, then death; extreme stunting of roots |
| Redroot Pigweed | 5/8 | 25 | 72 | Extreme chlorosis, then early death; minor stunting of roots |
| Velvet Leaf | 3/4 | 48 | 15 | Necrosis, then death. Extreme stunting of roots |
| Cotton Coker 201 | 3/4 | 83 | 72 | Much necrosis, minor stunting and discoloration of roots |
| Velvet Leaf | 4/4 | 47 | 46 | Necrosis, auxin effect and death of leaves; extreme discoloration auxin effect and sparseness of roots. |
| Cotton Coker 201 | 3/4 | 83 | 50 | Extreme necrosis and auxin effect in leaves; discoloration and auxin effect in roots. |

This compound exhibits some selectivity for corn and wheat.

EXAMPLE 6

Using the procedure described in Example 1, the following results were obtained with N-sulfamoyl-4-phenyl-1,2,5,6-tetrahydropyridine.

| Test Species | Plant/ Seeds | % of check Top Height | Root Length | Comments |
|---|---|---|---|---|
| Field Corn | 4/4 | 69 | 67 | Slight necrosis |
| Barnyard Grass | 3/4 | 59 | 52 | Extreme necrosis and death; roots stunted and discolored |
| Wild Oat | 4/4 | 45 | 124 | Necrosis |
| Johnson-grass | 1/4 | 26 | 63 | Much necrosis, roots extremely stunted |
| Dawn Rice | 1/4 | 60 | 23 | Slight necrosis; roots extremely stunted and discolored |
| Soybean Adelphia | 2/4 | 108 | 71 | Much necrosis; roots stunted |
| Coffee-weed | 3/4 | 72 | 63 | Minor necrosis and chlorosis; much stunting and discoloration of roots |
| Field Bindweed | 2/4 | 45 | 33 | Minor chlorosis; extreme stunting of roots. |
| Cotton Coker 201 | 4/4 | 52 | 39 | Necrosis, much discoloration and extreme stunting of roots |

The results with this compound were obtained at a dosage level of 10 parts per million. The compound showed some selectivity for corn.

EXAMPLE 7

N-sulfamoyl-N'-phenylpiperazine

In a suitable flask equipped with a stirrer and a condenser attached to a bubble detector, 1.0 moles of N-phenylpiperazine and 1.1 moles of sulfamide are dissolved in 750 ml. of pyridine. The solution is refluxed and stirred until gassing is no longer detected in the bubble detector. The solvent (pyridine) is removed in vacuo on a rotary evaporator. The crude product is recrystallized from methanol/water yielding the product, N-sulfamoyl-N'-phenylpiperazine, m.p. 174°–175° C.

Using similar procedures and refluxing N-sulfamide with the amine indicated in the following table the products shown are obtained.

| Amine | Product | Melting Point °C |
|---|---|---|
| N-(o-chlorophenyl)-piperazine | N-sulfamoyl-N'-(o-chlorophenyl)piperazine | 111–112 |
| N-(o-methoxy)piperazine | N-sulfamoyl-N'-(o-methoxyphenyl)piperazine | 153–155 |
| N-methylpiperazine | | 127 |
| 1,2,3,4-tetrahydroisoquinoline | N-sulfamoyl-1,2,3,4-tetrahydroisoquinoline | 157–159 |
| 1-benzyl-1,2,3,4-tetrahydroisoquinoline | N-sulfamoyl-1-benzyl-1,2,3,4-tetrahydroisoquinoline | 135–137 |
| N-methylcyclohexylamine | N-methyl-N-sulfamoylcyclohexylamine | 121.5–122.5 |
| 1-amino-1,2,3,4-tetrahydronaphthalene | 1,2,3,4-tetrahydro-1-sulfamoylaminonaphthalene | 99.5–100 |
| 1-aminoindane | 1-sulfamoylaminoindane | 115–116 |
| 2-aminoindane | 2-sulfamoylaminoindane | 151–152 |
| 4-phenyl-1,2,5,6-tetrahydropyridine | N-sulfamoyl-4-phenyl-1,2,5,6-tetrahydropyridine | |

EXAMPLE 8

N-dimethylsulfamoyl-N'-methylpiperazine

In a suitable flask, 0.1 moles of N-methyl-piperazine is admixed with 0.11 moles of dimethylsulfamoyl chloride in 150 parts by volume of dry diethyl-ether. The reaction mixture is maintained at a temperature between =10° and 20° C. for a period of 3 hours. The solvents are evaporated off and the product is recrystallized from 1:1 methanol-water.

What is claimed is:
1. A method for the destruction and prevention of weeds and unwanted plants which comprises applying to a locus to be protected, in amount sufficient to exert a herbicidal action, a compound having the structure:

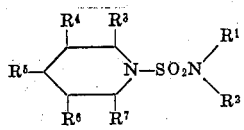

where
$R^1$, $R^2$, $R^3$, $R^4$, $R^5$, $R^6$ and $R^7$ each independently represent hydrogen or lower alkyl having one to four carbon atoms
provided at least three of $R^3$, $R^4$, $R^5$, $R^6$ and $R^7$ are hydrogen.

2. The method of claim 1 in which the compound is N-sulfamoylpiperidine.

3. The method of claim 1 in which the compound is 3,4-dimethyl-N-sulfamoylpiperidine.

4. The method of claim 1 in which the compound is 2-methyl-5-ethyl-N-sulfamoylpiperidine.

5. The method of claim 1 in which the compound is 4-(n-propyl)-N-sulfamoylpiperidine.

6. The method of claim 1 in which the compound is 2,5-dimethyl-N-sulfamoylpiperidine.

7. A composition suitable for the destruction and prevention of weeds and unwanted plants comprising a carrier and in an amount sufficient to exert a herbicidal action, a compound having the structure

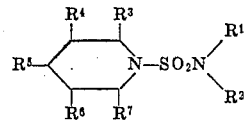

where
$R^1$, $R^2$, $R^3$, $R^4$, $R^5$, $R^6$, and $R^7$ each independently represent hydrogen or lower alkyl having one to four carbon atoms,
provided at least three of $R^3$, $R^4$, $R^5$, $R^6$ and $R^7$ are hydrogen.

* * * * *